May 4, 1943.  R. D. MacDONALD  2,318,406
MANURE SPREADER
Filed June 21, 1941  2 Sheets-Sheet 2
FIG. 3
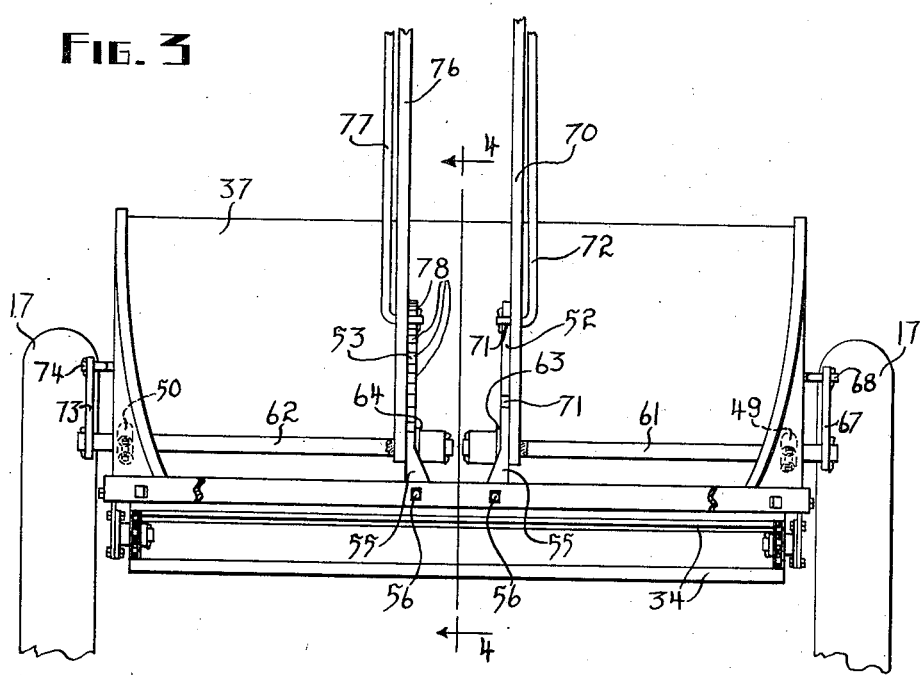
FIG. 5
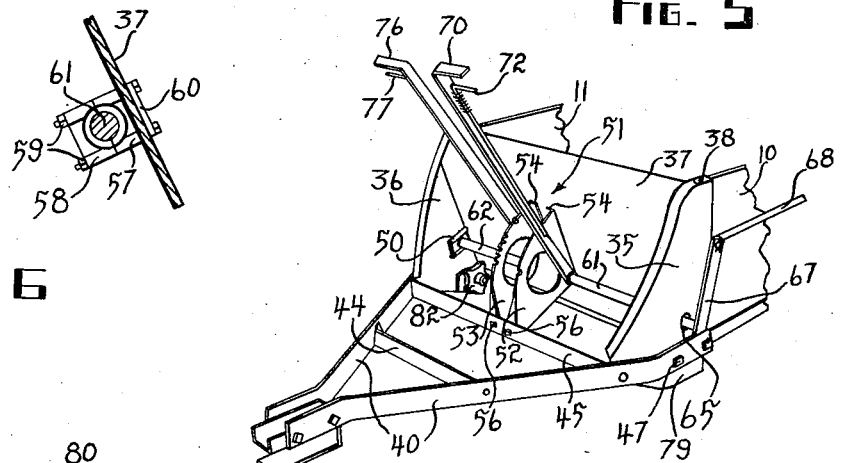
FIG. 6
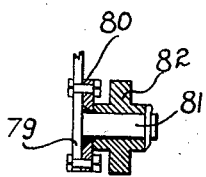
FIG. 7
INVENTOR
RAYMORE D. MacDONALD
BY Paul O. Rippel
ATTY Patented May 4, 1943

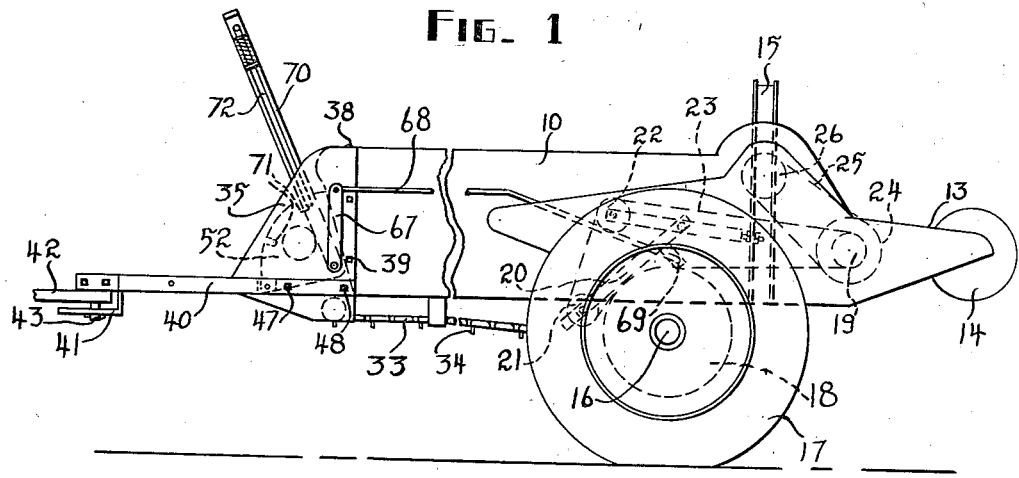

2,318,406

UNITED STATES PATENT OFFICE 2,318,406

MANURE SPREADER

Raymore D. MacDonald, Battle Creek, Mich., assignor to International Harvester Company, a corporation of New Jersey Application June 21, 1941, Serial No. 399,144

7 Claims. (Cl. 275—3)

The present invention pertains to improvements in manure spreaders and more particularly to the forward body construction for such spreaders and the mounting of operating or control mechanism therefor.

The ordinary spreader comprises a body having laterally spaced vertical side walls and a floor over which runs a feeding mechanism in the form of an endless conveyor or apron. The spreader body is carried on a wheeled axle which is associated with driving mechanism for driving the feeder apron and spreading or beater mechanism at the rear of the body. Whether the spreader be horse-drawn or connected to a tractor, the usual construction requires that operating or controlling mechanism for the spreading and feeding mechanisms be mounted at the forward end of the spreader body. The forward part of the apron is also carried by means disposed at the forward end of the body. In the case of a tractor-drawn spreader, the control means must be arranged on the spreader within convenient reach of the tractor operator. It is also relatively important in the case of a spreader of the two-wheel type that the forward end of the body be rigidly constructed, since this forward end is carried on a tractor draw-bar and supports substantially one-half of the weight of the loaded spreader.

A further problem is presented because of the modern requirements of streamlined constructions. Accordingly, it is important to provide a spreader construction which presents a pleasing appearance. Still further, there is presented the problem, in a two-wheel machine, of providing a spreader construction having a front end structure which is readily removable to permit the spreader to be converted to a four-wheel type in which the forward end of the spreader may be carried on a steerable front wheel assembly in lieu of being mounted on the tractor draw-bar.

The present invention seeks as its principal object the provision of a unit front end construction for a spreader body.

An object of prime importance is the provision of mounting means for the operating or controlling mechanism.

The invention seeks as a more specific object to provide a front end construction for a spreader in which the body side walls are extended further forwardly than the transverse front wall so that a space is provided which substantially encloses or houses operating or control means.

A further object of the invention is to provide an improved front end construction incorporating therein draft means of a rigid type adapted to support the forward end of the spreader on the draw-bar of the tractor or other draft vehicle.

Another object of the invention is to provide a front end construction substantially as a unit that may be readily removed from the forward end of the spreader body for the purpose of permitting a conversion of the spreader from a two-wheel type to a four-wheel type.

The invention seeks as a further and important object to provide improved means for mounting the forward end of the spreader apron or feeder mechanism.

And a still further object is to provide a construction which enhances the appearance of the spreader.

Further objects and features of the invention will become readily apparent to those versed in the art as the description of a preferred embodiment of the invention is made, reference being had to the accompanying sheets of drawings, in which:

Figures 1 and 2 are side elevational views taken from opposite sides, respectively, of one form of spreader embodying one form of the invention;

Figure 3 is a front end view on an enlarged scale;

Figure 4 is a longitudinal sectional view taken substantially along the line 4—4 of Figure 3;

Figure 5 is a perspective view of the front end construction;

Figure 6 is a detailed view showing the bearing for mounting a rock-shaft of the control or operating mechanism; and, Figure 7 is a detailed view of the mounting of a sprocket and stub shaft for the apron or feeder mechanism.

The spreader chosen for the purpose of illustration is of the two-wheeled type in which there is provided a longitudinal body carried at its rear end on a wheeled axle and at its forward end through the medium of a draft connection on the draw-bar of a tractor or other draft source. As shown especially in Figures 1, 3, and 5, the spreader body includes a pair of laterally spaced vertical side walls 10 and 11 disposed at opposite sides of a horizontal longitudinally disposed floor 12. The rear end of the spreader body is open, as is conventional, and the side walls have secured thereto a rearwardly extending supporting structure, generally indicated at 13, which serves to carry transverse spreading mechanism 14, which may be of any suitable type. The rear ends of the side walls 10 and 11 are rigidly cross-connected by an arch member 15, which may be of any conventional construction.

The rear end of the body is carried on a transverse axle 16 which is journaled at its opposite ends in wheels 17. The left-hand wheel 17, as viewed from a position directly behind the spreader and looking forwardly, includes in the conventional manner a drive sprocket 18. The spreading mechanism further includes the conventional beater mechanism. This mechanism is not shown, since it forms no part of the present invention, but it is referred to merely for the purpose of facilitating the present description. As shown in dotted lines in Figure 1, the spreading mechanism includes driving means, here in the form of a sprocket 19, and a carrier means 20 on which is mounted a pair of sprockets 21 and 22. A drive chain 23 is trained about the sprockets 19, 21, and 22. The carrier mechanism 20 is mounted for vertical movement to carry with it the lower forward run of the drive chain 23. This mechanism provides a chain-raising device of one particular type. This device may be of any suitable form and the type illustrated here is shown only for the purpose of clarifying the hereinafter description of the control or operating mechanism. The drive sprocket 19 serves to drive a sprocket 24, which through the medium of a drive chain 25, drives another sprocket 26. It will be understood that these sprockets are associated with the usual beater or spreader mechanism in any conventional fashion.

As shown in Figure 2, the right-hand wheel 17 serves to drive a cam 27. This cam is engageable with a roller 28 on an oscillating arm 29 which is in turn pivotally mounted on a transverse shaft 30 at the rear end of the spreader body. This shaft carries for rotation therewith a ratchet wheel 31 engageable by a pawl 32 carried by the arm 29. The shaft 30 further serves to carry in the usual manner driving sprockets for the rear end of a feeder apron 33. This apron consists of a pair of laterally spaced, endless drive chains cross-connected by a plurality of slats 34. The upper run of the apron follows along the floor 12 of the body. The forward end of the apron is carried at the front of the spreader body, as will hereinafter more fully appear. The mechanism provided by the cam 27, the arm 29, and the ratchet wheel 31 is one form of pawl and ratchet mechanism commonly used to obtain step-by-step movement to the apron for the feeding of material to the rear end of the spreader. This particular construction forms no part of the present invention and is illustrated and described only generally for the purpose of furnishing a background for the description of the control mechanism to be hereinafter referred to.

The unit front end construction provided by the present invention consists of a pair of laterally spaced vertical side sheets 35 and 36 secured respectively to the forward ends of the side walls 10 and 11 of the spreader body. As best shown in Figure 4, each side sheet is generally triangular in shape and the forward edge thereof, which is flanged, inclines downwardly and forwardly from the upper forward edge of the body side wall. A transverse front wall 37 is rigidly cross-connected between the side sheets 35 and 36. This wall inclines downwardly and rearwardly from a point substantially at the upper edge of the front of the body. The upper portion of the wall is curved rearwardly and is rigidly secured to the body side walls 35 and 36 by securing means in the form of bolts 38. The bolts 38 also pass through the frames on the side sheets 35 and 36. The curved upper portions of the wall 37 and of the side sheets 35 and 36 present a generally continuous line which enhances the appearance of the body. The rearward edges of the side sheets are secured, respectively, to the side walls 10 and 11 by a plurality of securing means in the form of bolts 39. In this manner the side sheets and front wall are rigidly although removably secured to the forward end of the spreader body. As best shown in Figure 4, the lower edge of the front wall 37 is spaced above the forward portion of the body floor 12 so that the upper run of the apron 33 may pass through the space thus provided.

The structural elements of the front end assembly are completed by the provision of draft means comprising a pair of forwardly extending draft members 40. These members are rigidly secured at their inner ends to the side sheets 35 and 36, respectively. The forward ends of the members converge and are rigidly secured to a hitch-connection means in the form of a clevis 41. As best shown in Figures 1 and 2, this clevis is adapted to be connected to the draw-bar of a tractor or other draft source. Such draw-bar is indicated generally at 42, and a pin 43 illustrates one form of means for connecting the spreader to the draw-bar.

The draft members 40 are rigidly cross-connected by a pair of transverse members 44 and 45 disposed in longitudinally spaced relation between the front wall 37 and the clevis 41. The rearwardmost cross member 45, as best shown in Figure 4, has opposite end flanges 46 associated with the side sheets 35 and 36 and with the draft members 40. Bolts 47 are passed through the side sheets and draft members, respectively, to provide a rigid brace across the front end of the spreader. Other securing means in the form of bolts 48 serve to complete the attachment of the draft members 40 to the side sheets 35 and 36. It will be noted that the cross member 45 is disposed at a point substantially in transverse alinement with the forward edges of the lower portions of the side sheets 35 and 36. It will be further noted that the member 45, the side sheets, and the inclined front wall 37 define a space generally in the form of a triangle. According to the present invention, this space is utilized to house or enclose control or operating mechanism for the spreader feeding and spreading mechanism previously described.

As best shown in Figures 3, 4, and 5, the lower portion of the transverse front wall 37 is provided with a pair of bearing supports 49 and 50, left and right, respectively. The bearing means 49 lies closely adjacent the side sheet 35, and the other bearing is similarly disposed with respect to the side sheet 36. These bearing means will be described later in greater detail. The front end unit is provided at a point substantially laterally intermediate the side sheets 35 and 36 with supporting structure or means generally indicated by the numeral 51.

According to the preferred embodiment of the present invention herein disclosed, this structure comprises a pair of laterally spaced brackets 52 and 53, left and right, respectively. Each bracket is in the form of what is commonly referred to as a quadrant or sector, and each is provided with a flanged rear edge 54 which provides means by which these members may be rigidly secured to the front wall 37. Forward portions of the brackets or quadrants are flanged as at 55 and are rigidly secured by bolts 56 to an intermediate portion of the transverse member 45. In addition to providing quadrants to be associated with the control mechanism to be hereinafter described, the brackets 52 and 53 serve as supporting or bracing means rigidly reenforcing the front wall 37 with respect to the cross member 45. It will be further noted that the quadrants, being segmental in shape, are substantially confined within the side sheets 35 and 36, as viewed from either side of the planter, a feature which contributes to the enhanced appearance of the machine.

As best shown in Figures 3, 4, and 6, each of the bearing means 49 and 50 comprises a pair of complementary halves 57 and 58 secured together by a pair of bolts 59 which pass through the front wall 37 and engage a reenforcing flat plate 60. Each of the halves 57 and 58 is provided with a semicylindrical recess, and these portions, when assembled, provide a bearing or journal for the outer ends, respectively, of a pair of transverse, coaxially disposed rock-shaft parts 61 and 62, left and right, respectively. The bearing means 49 carries the outer end of the rock-shaft part 61, and the bearing means 50 carries the part of the rock-shaft part 62. The rock-shaft part 61 extends transversely inwardly from the bearing 49 and is journaled at its inner end in a bearing 63 provided in or carried by the bracket or quadrant 52. The rock-shaft part 62 is similarly carried in a bearing 64 in the quadrant or bracket 53. The rock-shaft means, consisting of the two rock-shaft parts, is, as best shown in Figure 4, disposed parallel to and closely adjacent the lower portion of the transverse front wall 37. According to the preferred form of the invention illustrated, the rock-shaft mounting is wholly independent of the other portions of the spreader body as respects assembly and disassembly thereof. The side sheets 35 and 36 are provided with openings 65 and 66, respectively, through which the outer ends of the rock-shaft parts 61 and 62 pass.

As best shown in Figures 1 and 3, the outer end of the rock-shaft part 61 carries rigidly thereon an upstanding arm 67. The upper end of this arm is pivotally connected to the forward end of a rod 68 which extends rearwardly alongside the body side wall 10. The rear end of the rod 68 is connected at 69 to the chain-raising device or carrier 20, thus providing means by which the device may be lowered or raised according to whether or not the spreading mechanism is to be operated through the medium of engagement between the drive chain 23 and the sprocket 18. As previously stated, the construction and operation of this chain-raising device may be of any suitable form and the functioning thereof will be readily apparent to those versed in the art. The rock-shaft 61 carries at its inner end adjacent the bracket or quadrant 52 an upstanding control member in the form of a lever 70. This lever is mounted for movement with the rock-shaft through a range generally determined by the quarter-circle extent of the quadrant 52. In its uppermost position the lever 70 lies closely adjacent or parallels the inclined front wall 37. Since the chain-raising device 20 is movable into either one or two positions, in one of which the chain 23 is engaged with the sprocket 18 and in the other of which these parts are disengaged, the quadrant 52 is provided with only a pair of notches, as indicated generally at 71. The lever 70 carries locking or detent means 72 optionally engageable with the notches 71. This means may assume any suitable form.

As best shown in Figures 2 and 3, the outer end of the rock-shaft part 62 carries thereon, outside the side sheet 36, an upstanding arm 73 to which is connected the forward end of a longitudinally extending control rod 74. The rear end of the rod 74 is operatively connected to a bell crank 75 carried by the side wall 11. This bell crank is in turn connected by a link 75' to the arm 29 of the pawl and ratchet mechanism previously described. Rocking of the rock-shaft 62 imparts movement to the bell crank 75 which in turn serves to adjust the position of the arm 29 with respect to the cam 27 so that the arm is moved by the cam greater or lesser distances, which latter movement is reflected in the operation of the pawl and ratchet mechanism so that the feeder apron feeds greater or lesser amounts of material rearwardly of the spreader body. The functioning of the pawl and ratchet mechanism does not differ materially from that ordinarily familiar to those skilled in the art.

The inner end of the rock-shaft 62 carries rigidly thereon an upstanding control or operating member 76. This member or lever is provided with locking or detent means 77 adapted to engage any of a plurality of notches 78 in the bracket or quadrant 53. This quadrant is provided with a plurality of notches, because the arm 29 of the pawl and ratchet mechanism may be adjusted to any one of a plurality of positions with respect to the cam 27 on the axle 16. This lever is adapted for movement about the quadrant 53, and in its upper position, like the lever 70, lies closely adjacent or parallel to the inclined front wall 37.

As best shown in Figures 4 and 7, each of the side sheets 35 and 36 is provided with a portion which depends below the bottom of the body side walls or the draft members 40. This portion is designated in the drawings by the numeral 79. Each portion 79 has rigidly secured thereto a bracket in the form of a flange 80 to which is rigidly secured, as by welding, a transversely extending stub shaft 81. The stub shafts are transversely alined at the front of the body, and each carries rotatably thereon a sprocket 82. These sprockets have trained thereabout the forward loops of the drive chains of the feeder apron 33. There is thus provided means carried by the front end construction which serve to support the forward end of the apron or feeding mechanism. These shafts may be readily disconnected from the apron when it becomes necessary to remove the front end construction as a unit.

It will be seen from the foregoing description that the improved front end construction materially increases the efficiency and enhances the appearance of a spreader of the type illustrated. The construction may be suitably adapted for use in other types of spreaders. However, most spreaders of similar design vary in only slight details, and the adaptability of the invention thereto would present no difficult problems.

As stated previously, an important object of the invention is to provide a construction in which the operating or control mechanism, such as the levers 70 and 76, is conveniently located in a generally triangular or box-like space provided by the relation between the extensions of the spreader side walls and a transverse front wall. This space may be enclosed at the front, if desired. As viewed from the side of the spreader, the extensions on the body side walls substantially conceal the lower portions of the control mechanism, all of which materially enhances the appearance of the spreader. At the same time the various parts of the control mechanism, such as the brackets or quadrants 52 and 53, serve to provide means for reenforcing the front end construction. Also previously stated, the entire front end may be removed as a unit from the spreader body. For this purpose, the parts of the draft means and control means are preferably mounted wholly or at least almost entirely independently of the main body construction of the spreader.

Certain other important and incidental detailed features of the construction will be apparent to those skilled in the art. It will be understood of course, that the foregoing disclosure is of only a preferred embodiment of the invention and that numerous modifications and alterations may be made therein without departing from the spirit and scope of the invention as defined in the appended claims.

What is claimed is:

1. In a manure spreader having a body including laterally spaced, vertical side walls, a removable, unit front end construction comprising a pair of laterally spaced vertical side sheets adapted respectively to be secured to the body side walls, a transverse, substantially vertical front wall cross-connecting the side sheets, and operating mechanism for the spreader disposed between the side sheets and front wall of the unit and carried wholly thereby independently of the spreader body.

2. In a manure spreader having a body including laterally spaced, vertical side walls and a longitudinal feeder apron, a removable, unit front end construction comprising a pair of laterally spaced vertical side sheets adapted respectively to be secured to the body side walls, a transverse, substantially vertical front wall cross-connecting the side sheets, operating mechanism for the spreader disposed between the side sheets and front wall of the unit and carried wholly thereby independently of the spreader body, and means carried wholly by said unit for supporting the forward end of the feeder apron.

3. In a manure spreader having a body including laterally spaced, vertical side walls and a feeder apron, a removable, unit front end construction comprising a pair of laterally spaced vertical side sheets adapted respectively to be secured to the body side walls, a transverse front wall cross-connecting the side sheets, and means carried wholly by said unit independently of the spreader body for supporting the forward end of the feeder apron.

4. In a manure spreader having a body including laterally spaced, vertical side walls and a feeder apron, a removable front end unit comprising a pair of laterally spaced vertical side sheets adapted respectively to be secured to the body side walls, a transverse front wall cross-connecting the side sheets, and means carried wholly by said unit independently of the spreader body for supporting the forward end of the feeder apron and including a pair of transverse, coaxially disposed stub shafts carried respectively by the side sheets and extending inwardly thereof.

5. In a manure spreader having a body including laterally spaced, vertical side walls, a removable front end unit comprising a pair of laterally spaced vertical side sheets adapted respectively to be secured to the body side walls, a transverse front wall cross-connecting the side sheets, draft means for the spreader including a pair of forwardly extending members connected respectively to the side sheets, and a cross member spaced forwardly of the front wall and rigidly cross-connecting said members and side sheets, and operating mechanism for the spreader carried by and between the front wall and the cross member independently of the spreader body.

6. In a manure spreader having a body including laterally spaced, vertical side walls, a removable front end unit comprising a pair of laterally spaced vertical side sheets adapted respectively to be secured to the body side walls, a transverse front wall cross-connecting the side sheets, and draft means for the spreader including a pair of forwardly extending members connected respectively to the side sheets and removably associated with the body side walls and a cross member spaced forwardly of the front wall and rigidly cross-connecting said members and side sheets.

7. In a manure spreader having a body including transversely spaced, vertical side walls, a front wall disposed transversely between the side walls, a removable front end unit comprising transversely spaced side sheets adapted respectively to be removably secured to the body side walls, and draft means for the spreader including a pair of forwardly extending members connected respectively to the side sheets and removable with said sheets from the body.

RAYMORE D. MacDONALD.